(12) United States Patent
Gilkes

(10) Patent No.: US 9,518,629 B2
(45) Date of Patent: Dec. 13, 2016

(54) PROTECTIVE DEVICE FOR SPORTS EQUIPMENT

(71) Applicant: Robert Gilkes, Winnipeg (CA)

(72) Inventor: Robert Gilkes, Winnipeg (CA)

(*) Notice: Subject to any disclaimer, the term of this patent is extended or adjusted under 35 U.S.C. 154(b) by 122 days.

(21) Appl. No.: 14/623,737

(22) Filed: Feb. 17, 2015

(65) Prior Publication Data

US 2015/0157916 A1    Jun. 11, 2015

Related U.S. Application Data

(63) Continuation-in-part of application No. 13/412,030, filed on Mar. 5, 2012, now abandoned.

(60) Provisional application No. 61/452,242, filed on Mar. 14, 2011, provisional application No. 61/543,024, filed on Oct. 4, 2011.

(51) Int. Cl.
    *A63B 71/00*      (2006.01)
    *F16F 9/02*      (2006.01)
    *A63C 19/08*      (2006.01)
    *A63C 19/10*      (2006.01)

(52) U.S. Cl.
CPC ............... *F16F 9/02* (2013.01); *A63C 19/08* (2013.01); *A63B 2071/0063* (2013.01); *A63B 2102/24* (2015.10); *A63C 19/10* (2013.01); *A63C 2019/085* (2013.01)

(58) Field of Classification Search
CPC ............ F16F 9/02; A63C 19/08; A63C 19/10; A63C 2019/085; A63B 2102/24; A63B 2071/0063; A63B 71/0054

USPC .............................................. 267/139; 472/94
See application file for complete search history.

(56) References Cited

U.S. PATENT DOCUMENTS

| | | | | |
|---|---|---|---|---|
| 4,927,134 A | * | 5/1990 | Burley | A63C 19/10 256/24 |
| 5,706,625 A | * | 1/1998 | Vallance | A63C 19/10 256/24 |
| 6,622,434 B1 | * | 9/2003 | Garrett | A63C 19/10 256/24 |
| 7,727,609 B1 | * | 6/2010 | Crasno | A63B 6/00 428/100 |
| 7,849,653 B2 | * | 12/2010 | Guertin | A63C 19/06 472/94 |
| 7,914,385 B2 | * | 3/2011 | Palumbo | A63C 19/10 472/92 |
| 8,696,478 B2 | * | 4/2014 | Kapsalis | A63C 19/10 472/94 |
| 8,795,106 B2 | * | 8/2014 | Guertin | A63B 71/0054 473/471 |
| 9,091,091 B2 | * | 7/2015 | Sicking | E04H 3/00 |
| 9,283,469 B2 | * | 3/2016 | Riley | A63C 19/10 |

(Continued)

*Primary Examiner* — Thomas J Williams
*Assistant Examiner* — Mariano Sy
(74) *Attorney, Agent, or Firm* — Kyle R. Satterthwaite; Ryan W. Dupuis; Ade & Company Inc.

(57) ABSTRACT

Safety or protective devices for use in preventing or limiting injury to players impacting against sports equipment use compression coil springs, gas springs, foam or combinations thereof to absorb force during the impact. Particular embodiments are configured for use at the edge of a glass viewing and shielding panel disposed atop the boards of a hockey rink, for example such edges typically found at the team bench of a conventional hockey rink. A shock absorbing system of the device is positioned so as not to reach beyond the plane of the glass into the area of play.

18 Claims, 12 Drawing Sheets

(56) References Cited

U.S. PATENT DOCUMENTS

2003/0119591 A1\* 6/2003 Frazier ................ A63B 71/022
472/88
2012/0261867 A1\* 10/2012 Gilkes ................ A63C 19/062
267/139

\* cited by examiner

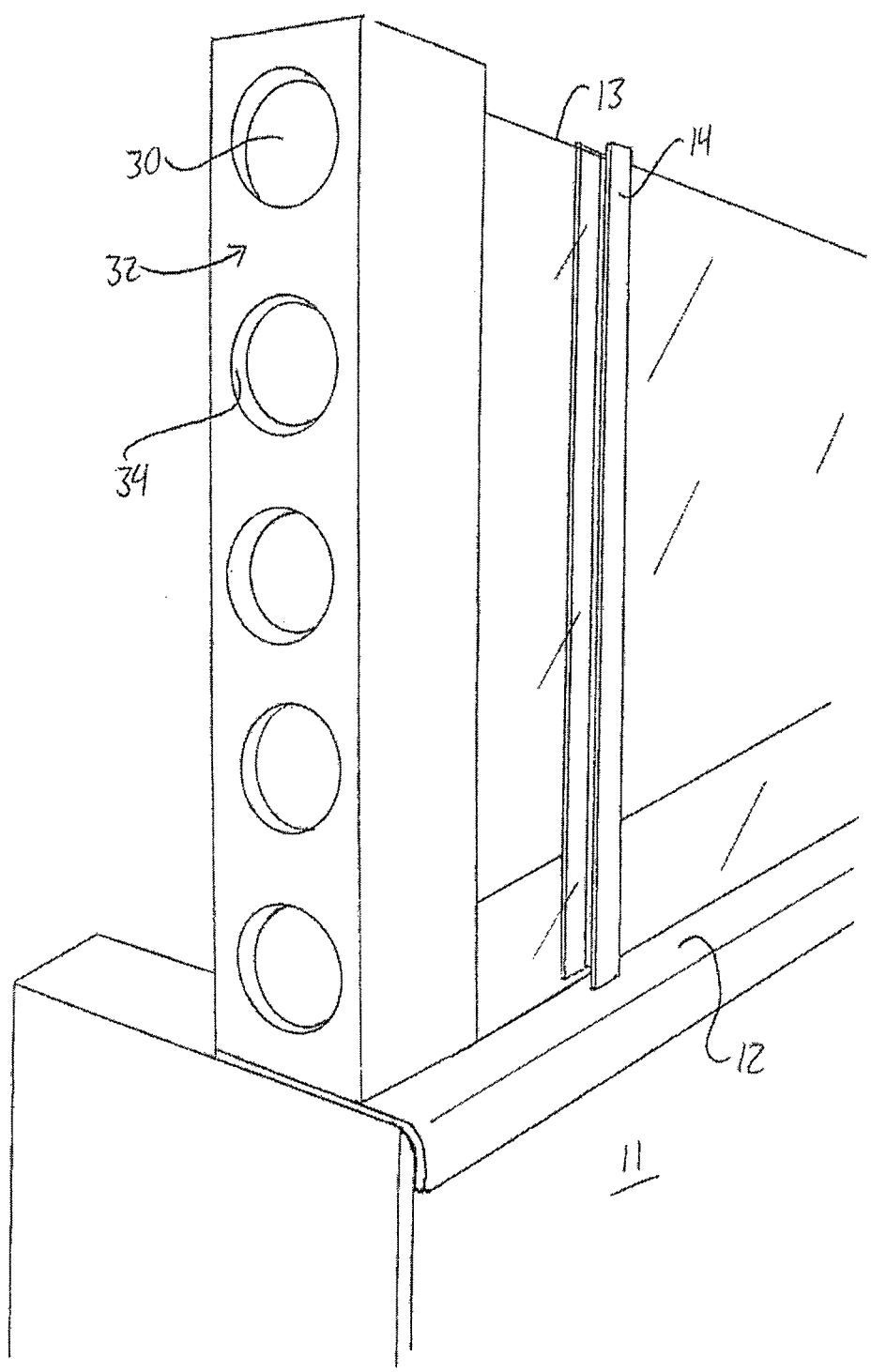

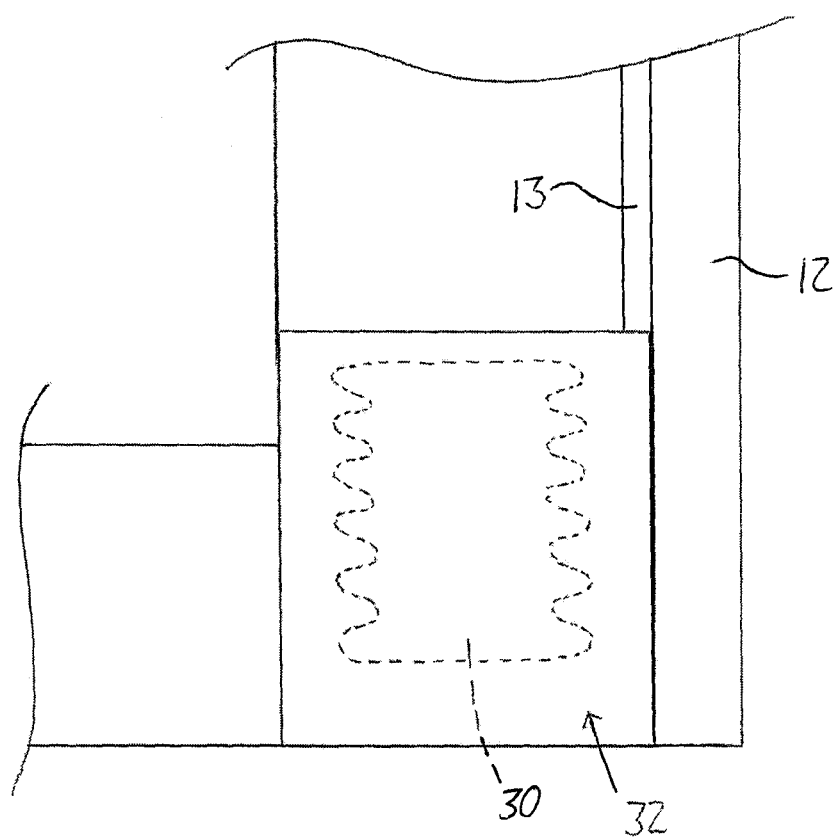

PROTECTIVE DEVICE FOR SPORTS EQUIPMENT

CROSS REFERENCE TO RELATED APPLICATIONS

This application is a continuation-in-part of U.S. Non-Provisional application Ser. No. 13/412,030, filed Mar. 5, 2012, which claims benefit under 35 U.S.C. 119(e) of U.S. Provisional Patent Application Ser. No. 61/452,242, filed Mar. 14, 2011, and U.S. Provisional Patent Application Ser. No. 61/543,024, filed Oct. 4, 2011, each of which is incorporated herein in its entirety.

FIELD OF THE INVENTION

This invention relates to a protective device for use on sports equipment in a situation where a sports player may impact the equipment during play such as the glass of a hockey rink.

BACKGROUND OF THE INVENTION

It is known in hockey that the edge of the glass at the opening in the glass for the player's bench and the penalty box is a dangerous position for players in that they can be driven into this edge during a game. However, to the Applicant's knowledge, no solution to protecting the players from impact with this edge was previously available or even considered prior to Applicant's invention. This is one example of a situation where a sports player may impact a stationary object; but the arrangement herein can be used with other examples, such as a football post or a basketball stanchion.

SUMMARY OF THE INVENTION

According to one aspect of the invention there is provided a protective device for use on a stationary sports equipment comprising:

a bracket for mounting on the equipment;

an upstanding elongate padded engagement member generally parallel to the equipment so as to be supported at a position spaced from the equipment;

and at least one shock absorbing spring allowing movement of the engagement member in a direction toward the equipment.

In one particular end use there is provided a protective device for use on the glass of a hockey rink comprising:

a bracket for mounting on the edge of a sheet of glass of the hockey rink;

an upstanding elongate engagement member generally parallel to the bracket of a height the same of similar to that of the height of the glass so as to be supported at a position spaced from the edge of the sheet of glass;

and a shock absorbing system located between the bracket and the engagement member allowing movement of the engagement member in a direction toward the edge of the glass.

Preferably the shock absorbing system includes a plurality of springs. Many different types of springs can be used to absorb the impact and to compress to a small length to allow the distance between the engagement member and the glass to be used to gradually take up the impact forces from a player impacting the engagement member.

Preferably the engagement member is rigid so that it remains straight when impacted and simply moves to one side under the impact toward the glass edge.

Preferably the shock absorbing system is arranged to return the engagement member to the original position after absorbing the impact to allow the game to continue without pause.

Thus there is preferably provide a guide system for guiding movement of the engagement member in a horizontal direction parallel to the glass. In this way the engagement member is maintained in the plane of the glass and is prevented from hinging inwardly under an impact.

Preferably the guide system comprises a track extending along the top sill of the boards extending outwardly from the bottom edge of the glass.

Preferably the guide system includes a guide member along the top edge of the glass. However other mechanical devices can be used to locate the engagement member.

Preferably there is provided a band of padding between the engagement member and the edge of the glass on the inside of the glass facing the players. And preferably the band of padding slides in front of the glass when the engagement member is impacted to compress the shock absorbing system. The band of padding therefore closes off the space between the edge and the engagement member and hides the shock absorbing system.

However the space between the engagement member and the edge of the glass on the outside of the glass facing away from the players can be open or it can be covered by a simple cover to hide the shock absorber, bearing in mind that there is no requirement for padding in this area.

In one preferred arrangement, the shock absorbing system includes at least one gas spring.

These can be individual gas springs of a cylindrical shape forming a plurality of gas springs in a row or array.

Preferably the gas spring or springs are embedded in a resilient material such as a foam.

Preferably the gas spring or springs are received in cylindrical holes located in the resilient material.

Preferably the gas spring or springs are arranged to compress parallel to the direction of impact.

Preferably the gas spring or springs compress by allowing air to escape through a discharge valve and re-expand by resilience in a wall of the spring acting to re-inflate the spring and return the expelled air.

In the arrangement described above the edge of the glass lies in a flat plane containing the glass.

However in another arrangement, the edge of the glass is curved out of the flat plane of the glass and the bracket is mounted on the convex side of the curved edge.

Preferably there is provided a row of gas springs along the edge of the glass. However as an alternative there is provided one or more elongate gas springs extending along the member.

Where visibility is required there can be provided a cover over the device which is transparent and the springs are formed from a transparent material.

In some cases the foam is omitted so that there is provided a row of gas springs which are independent of foam material so that the resilience of the spring is provided solely by the compression of the gas springs.

According to another aspect of the invention there is provided a protective device for an edge of a panel carried on boards of a hockey rink, the device comprising:

a bracket for mounting at or on the edge of the panel;

an upstanding engagement member of a height the same or similar to that of the panel to be supported at a position spaced from the edge of the panel;

and a shock absorbing system located between the bracket and the engagement member and allowing movement of the engagement member relative to the edge of the panel.

According to another aspect of the invention, in combination with an upright panel mounted atop boards of a hockey rink that delimit a playing area thereof, there is provided a protective device for an edge of said panel, the device comprising:

a bracket mounted at or on the edge of the panel;

an upstanding engagement member equal or similar in height to the panel, the engagement member being supported in a position placing an outer face of the engagement member in an orientation facing away from said edge of the panel at a distance spaced therefrom in a lengthwise direction of the boards;

and a shock absorbing system located between the bracket and the outer face of the engagement member and being compressible in a longitudinal impact direction that is parallel to a flat upright plane of the panel and parallel to the lengthwise direction of the boards, whereby the shock absorbing system is arranged to absorb against the outer face of the engagement member in the longitudinal impact direction;

wherein the shock absorbing system is free of any component or portion that extends beyond the flat upright plane of the panel into the playing area of the hockey rink.

BRIEF DESCRIPTION OF THE DRAWINGS

Embodiments of the invention will now be described in conjunction with the accompanying drawings in which:

FIG. 9 is a perspective view illustrating placement of the second embodiment device of FIG. 3 such that no portion of the springs extends beyond the upright plane of the glass.

FIG. 10 is a partial overhead plan view of the device of FIG. 9.

In the drawings like characters of reference indicate corresponding parts in the different figures.

DETAILED DESCRIPTION

Figure 1:
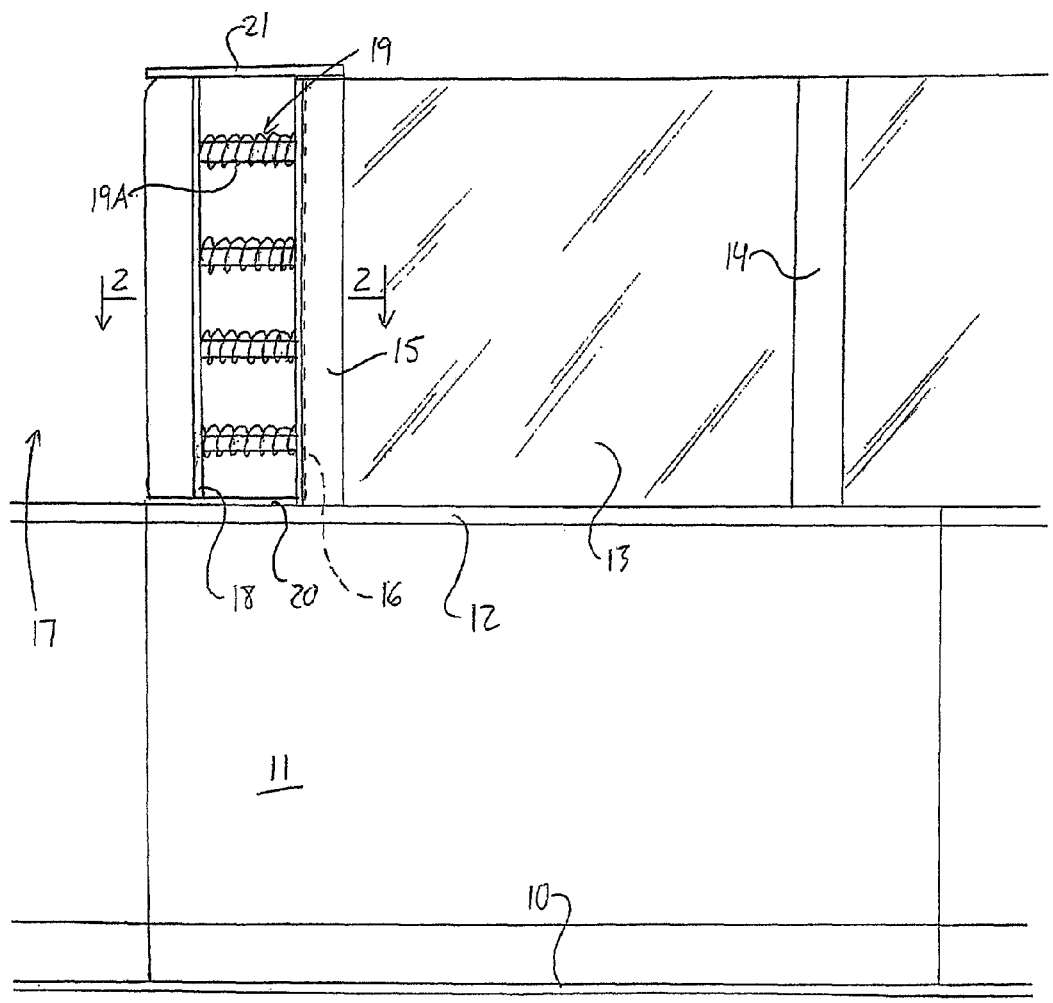
FIG. 1 is a front elevational view of boards of a hockey rink, showing an edge of the glass at an opening therein and a safety or protective device of a first embodiment the present invention mounted at the glass edge to absorb player impact using compression coil springs.

In FIG. 1 is shown a part of a hockey rink including a layer of ice 10, the boards 11 at the ice edge including a top rail 12 and the glass on top of the rails indicated at 13 formed in separate panels and carried in vertical brackets 14 supporting the edges of the panels.

The present invention provides a protective device for use on the glass of a hockey rink. This includes a bracket 15 for mounting on the exposed edge 16 of a sheet of glass of the hockey rink where there is an opening 17 in the span of glass around the playing surface, for example at the penalty box or team bench.

An upstanding elongate engagement member 18, which may for example by a flat plate of metal or other substantially rigid material, has a height that lies generally parallel to the bracket 15 and is the same or similar to the height of the glass so as to be supported at a position spaced from the edge of the sheet of glass.

A shock absorbing system 19 is located between the bracket 15 and the engagement member 18 allowing movement of the engagement member in a direction toward the edge of the glass.

The shock absorbing system includes a plurality of springs 19A at spaced positions along the height of the engagement member. The springs absorb the impact and compress to a smaller length to allow the distance between the engagement member and the glass to be used to gradually take up the impact forces from a player impacting the engagement member. This movement may typically of the order of 3 to 6 inches, but may be more in the order of 1 to 3 inches, and preferably 1 to 2 inches, in order to keep the overall size and bulk of the device to a minimum.

The engagement member 18 is rigid so that it remains straight when impacted and simply moves to one side toward the glass under the impact toward the glass edge.

The springs of the shock absorbing system act to return the engagement member to the original position after absorbing the impact to allow the game to continue without pause.

There is provided a guide a track 20 extending along the top rail 12 of the boards extending outwardly from the bottom edge of the glass or bottom end of the bracket 15 and a guide member 21 along the top edge of the glass for guiding movement of the engagement member in the horizontal direction parallel to the vertical plane of the glass. In this way the engagement member is maintained in the plane of the glass and is prevented from hinging inwardly under an impact.

The engagement member is covered by a layer of padding 22 on its face away from the glass edge and a band 24 of padding is located between the engagement member and the edge of the glass and extends onto the inside of the glass facing the players on the ice. The band of padding slides in front of the glass when the engagement member is impacted to compress the shock absorbing system. The band of padding therefore closes off the space between the glass edge and the engagement member and hides the shock absorbing system.

Between the engagement member and the edge of the glass on the outside of the glass facing away from the players is partly covered by a lip 23 of the padding 22.

Figure 2:
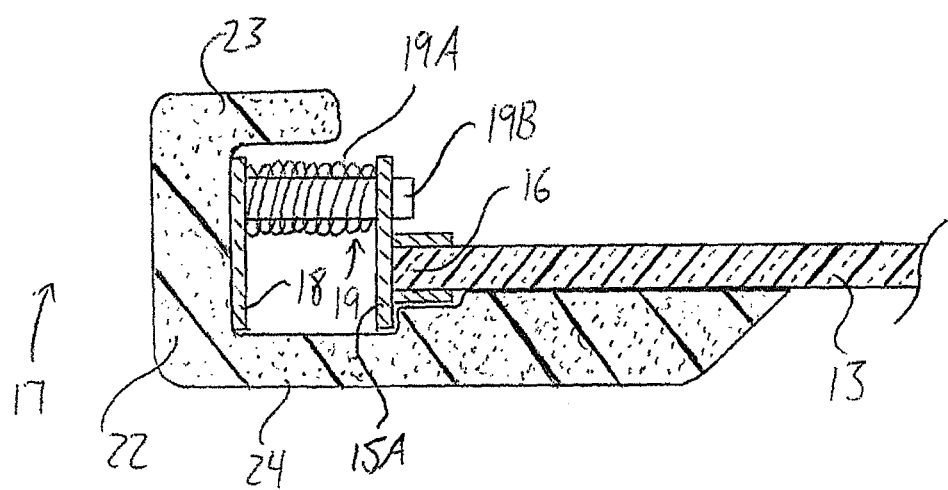
FIG. 2 is a cross-sectional view as taken along the lines 2-2 of FIG. 1.

As also shown in FIG. 2, a guide rod, bar or pipe 19B having an outer diameter smaller than the inner diameter of the spring's coils is received within the spring so that the coils thereof wind around the guide 19B. One end of the guide 19B is fixed to the engagement member 18, and the guide 19B passes through a hole in a portion 15A of the bracket that lies in a vertical plane perpendicular to the plane of the glass 13 at the edge 16 of the glass 13. This hole in the bracket 15 is located on an outer side of the plane of the glass 13. When the spring 19A is compressed during travel of the engagement member 18 toward the bracket 15, the free end of the guide 19B thus travels along the glass on the outside thereof. The guide 19B prevents the spring 19A from deflecting significantly from its horizontal longitudinal axis parallel to the plane of the glass 13.

Figure 2A:
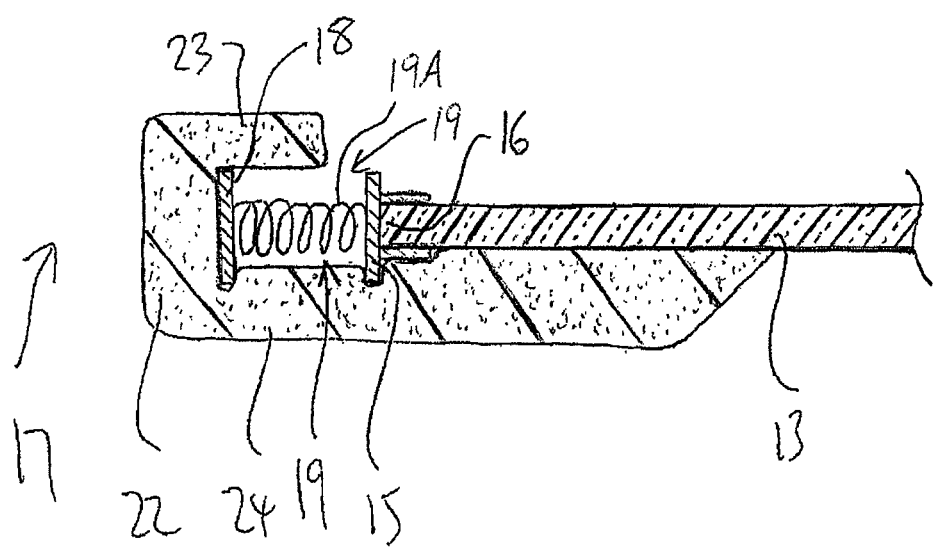
FIG. 2A is a cross-sectional view like that of FIG. 2, but of a first variant of the first embodiment safety or protective device.

FIG. 2A shows a first variant of the embodiment of FIGS. 1 and 2 where no guides are present inside the springs 19A, and accordingly the springs need not be offset from the plane of the glass 13. However, the springs may be more subject to deflection from a horizontal spring axis parallel to the plane of the glass 13.

Figure 2B:
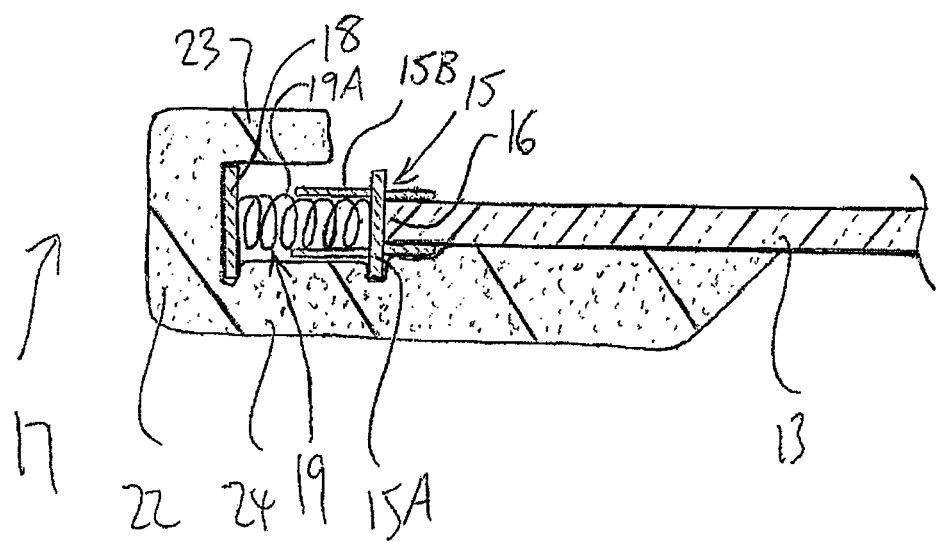
FIG. 2B is a cross-sectional view like that of FIG. 2, but of a second variant of the first embodiment safety or protective device.

FIG. 2B shows a further variant of the first embodiment, where instead of using a guide rod/bar/pipe 19B to maintain the orientation of the spring axis parallel to the plane of the glass, the bracket 15 defines a channel 15B that opens toward the engagement member 18, much like the channel on the other side of the bracket that embraces the edge 16 of the glass 13, and the extends into this channel 15B to make the connection to the portion 15A of the bracket lying perpendicular to the glass 13 at the vertical edge 16 thereof. Space is left between the open end of the channel 15B and the normal spring-biased position of the engagement member to leave room for the displacement thereof under impact by a player, while the vertical side walls of the channel 15B act to block or limit horizontal deflection of the spring, at least over the portion thereof received between the side walls of the channel.

Figure 3:
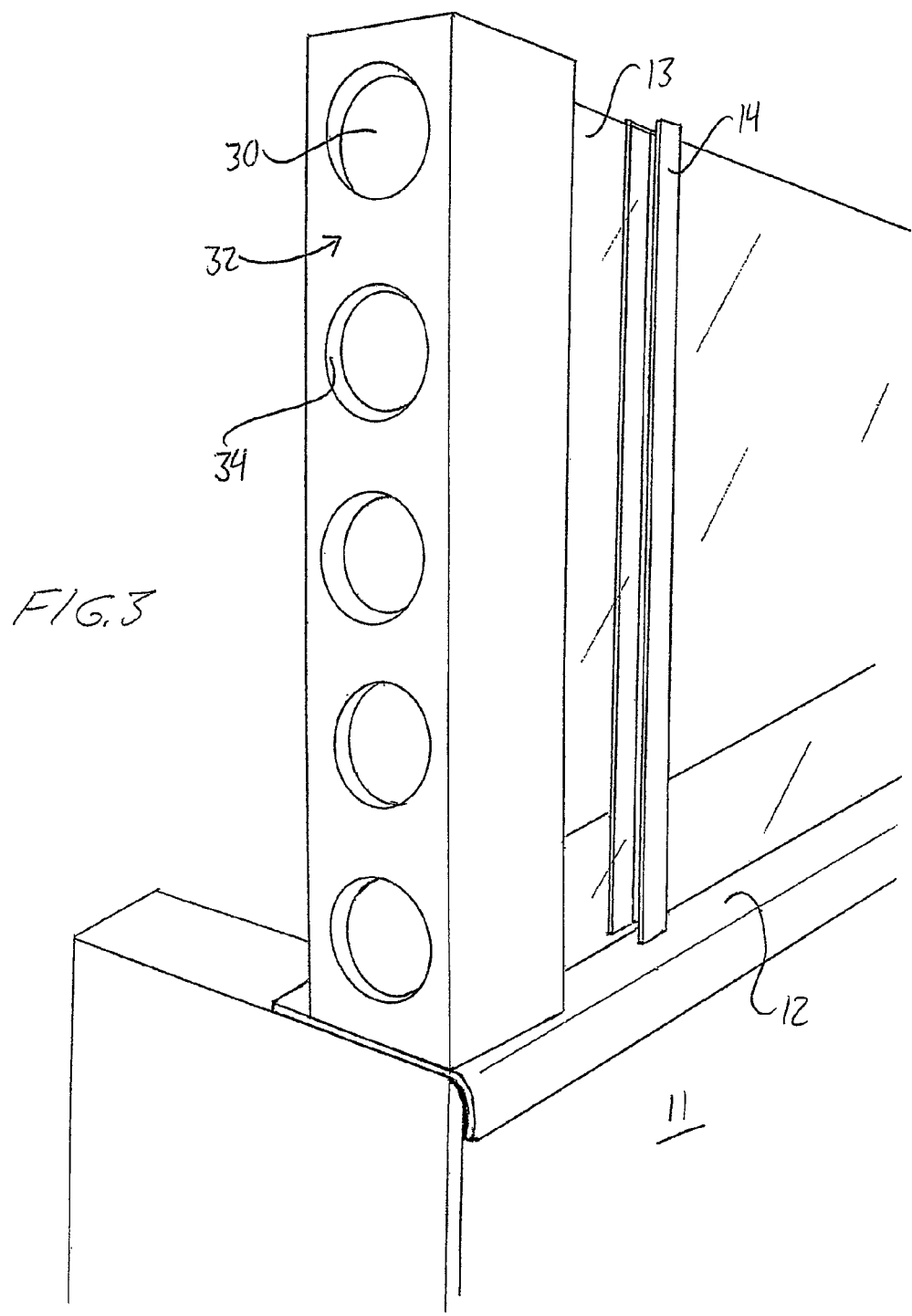
FIG. 3 is a perspective view of a second embodiment safety or protective device employing gas springs embedded in a foam body.

In FIG. 3 is shown a second embodiment in which the shock absorbing system includes gas springs 30 embedded in a block of foam 32 with cylindrical holes 34 cut in the foam to receive the individual spaced-apart springs in a row along the edge of the glass 13. The springs are embedded in the block of resilient foam or other similar resilient material, which has an elongated vertical dimension matching or closely following the height of the glass. Each gas spring is arranged to compress between its ends by collapse of a corrugated peripheral wall 36 along an axis of the spring parallel to the direction of impact. This is controlled by allowing air to escape through an adjustable discharge valve 40 and re-expand by resilience in the peripheral wall of the spring acting to re-inflate the spring and return the expelled air. Although the drawings illustrate gas springs with empty interiors, whereby the re-expansion of the spring is provided entirely by the resilience of the corrugated peripheral wall, other embodiments may employ a soft coil spring disposed inside the gas spring body to contribute to a faster return of the gas spring to its normal extended state.

In this arrangement the player impacts an outer edge of the foam body, which lies opposite and faces away from the edge of the glass, and the base of the gas springs at or near this outer edge of the foam body so that there is no need for an additional padded engagement member which moves toward the edge of the glass, as the whole construction can compress in the direction of impact. The gas springs enhance or increase the resistance of the foam to compression.

The FIG. 3 device has the foam body mounted directly to the edge of the edge of the glass or a bracket or support located at the glass edge. The foam block may feature a vertical slot running along the height of the block in the edge or side thereof facing the edge of the glass to allow receipt of the glass, bracket or support within the slot so that the foam embraces opposite sides of the glass, bracket or support. Options for securing the foam block in place include adhesive, Velcro™ hook and loop fasteners, or string, rope, straps or belts tied around the block and through suitable openings cut or otherwise formed in the glass, bracket or support.

Figure 4:
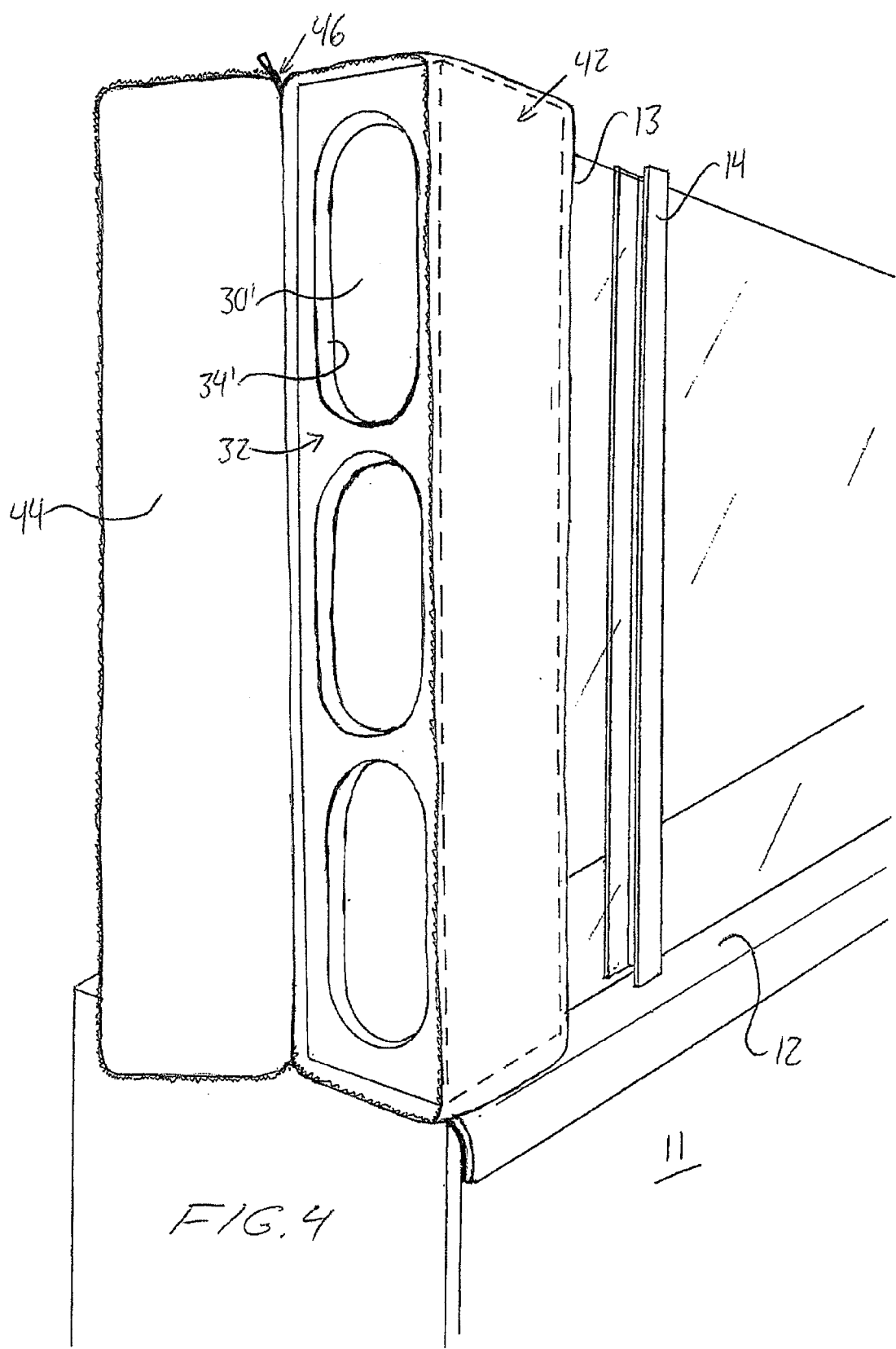
FIG. 4 is a perspective view like that of FIG. 3, but of a first variant of the second embodiment that uses gas springs of elongated cross-section and features a zipper-openable cover over the foam body.
Figure 5:
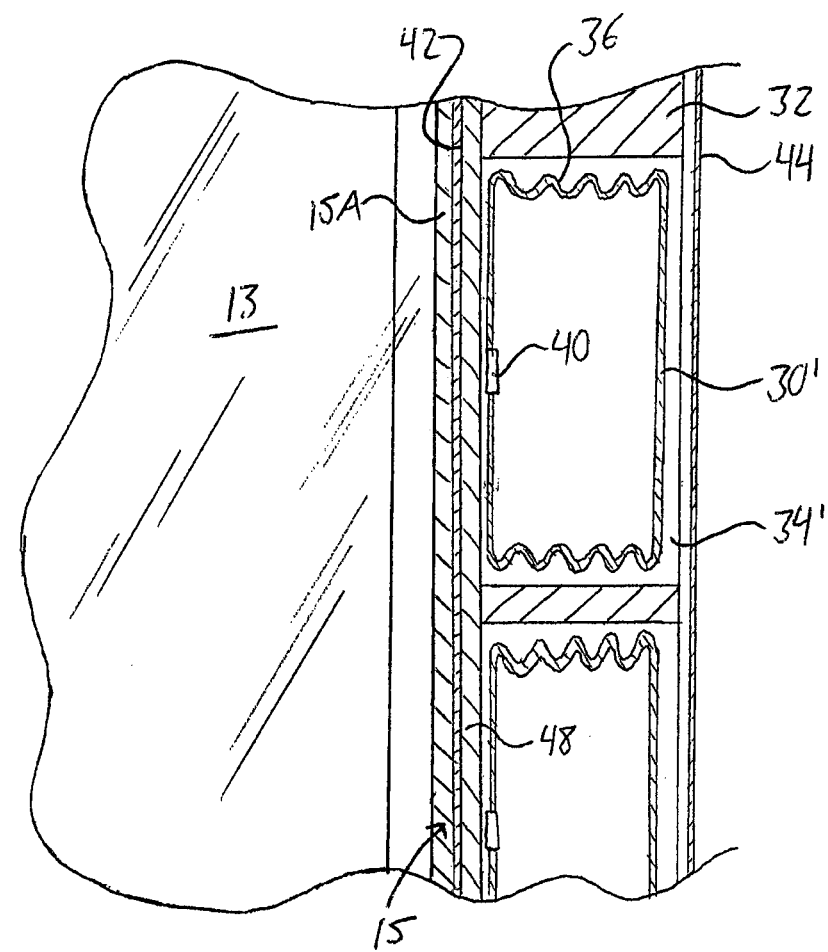
FIG. 5 is a partial cross-sectional view of the device of FIG. 4 at the vertical plane of the glass.

FIGS. 4 and 5 show a variant of the embodiment of FIG. 3, wherein a cover 42 of flexible material or fabric is added to enclose and protect the rectangular foam block 32. The illustrated cover 42 defines a generally rectangular interior volume to closely fit the foam block 32, and features a folding rectangular flap 44 to selectively open and close the cover 42 at the outer side or edge of the foam block 32 for access to the block and the gas springs inside the container for inspection, repair or replacement. A suitable fastening mechanism is provided to allow the closure flap 44 of the cover to be secured in a closed position (FIG. 5) over the foam block when the device is in use. In the illustrated embodiment, a zipper 46 is used for closing the cover 24 through engagement of mating zipper teeth on three matching sides of the closure flap 44 and the cover opening to be closed thereby, as can be seen in FIG. 4 where the closure flap 44 is in the open position.

The FIG. 4 variant also differs from FIG. 3 in that the holes 34' in the foam block 32 and the gas springs 30' received in the holes are not of circular cross-section, instead each having an oblong or other vertically-elongated cross-section to span a larger portion of the overall height of the device along the vertical edge of the glass 13, and so fewer holes and springs are required. This demonstrates the number, size and shape of the gas springs may be varied while still providing the same overall functionality. FIG. 5 shows that the device may incorporate a rigid base plate 48 lying between the foam block 32 and the bracket 15 for use in fastening the device to the bracket 15 at the edge of the glass 13, for example using threaded fasteners engaged through the two. The base plate 48 is shown inside the cover 42, but alternatively may be located on the exterior thereof.

The illustrated foam-embedded gas springs have the outer faces thereof (i.e. the ends of the spring opposite the edge of the glass) situated at positions slightly recessed into the foam block from the outer face thereof so that the compression of the gas spring only comes into play under sufficient impact to drive the outer face of the foam far enough inward to reach the outer ends of the springs. Other embodiments may have the spring ends flush with the outer face of the foam block, or have the springs project outward from the foam block to form part or all of the initial impact area. The valves of the gas springs may be situated at either end of the respective holes in the foam block, and may communicate only with the hollow space inside the foam, or suitable airflow passages or conduits may pass through the foam to communicate the gas springs with the ambient environment outside the foam body. The holes in the foam body may be through-holes passing entirely therethrough, or blind-holes passing only partly through the body from one side thereof, whether from the inner edge or side of the foam body nearest the glass or the opposing outer edge or side.

In the arrangements described above, the edge of the glass lies in a flat plane containing the glass.

Figure 6:
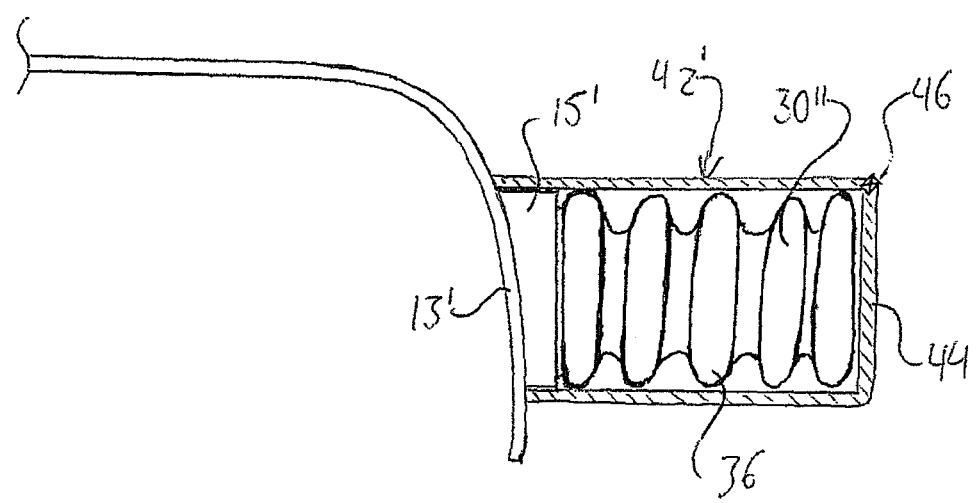
FIG. 6 is an overhead plan view of a second variant of the second embodiment employing a single gas spring of elongated cross-section mounted on a glass panel having a curved edge portion, the top end of the cover being cut away for illustrative purposes.
Figure 7:
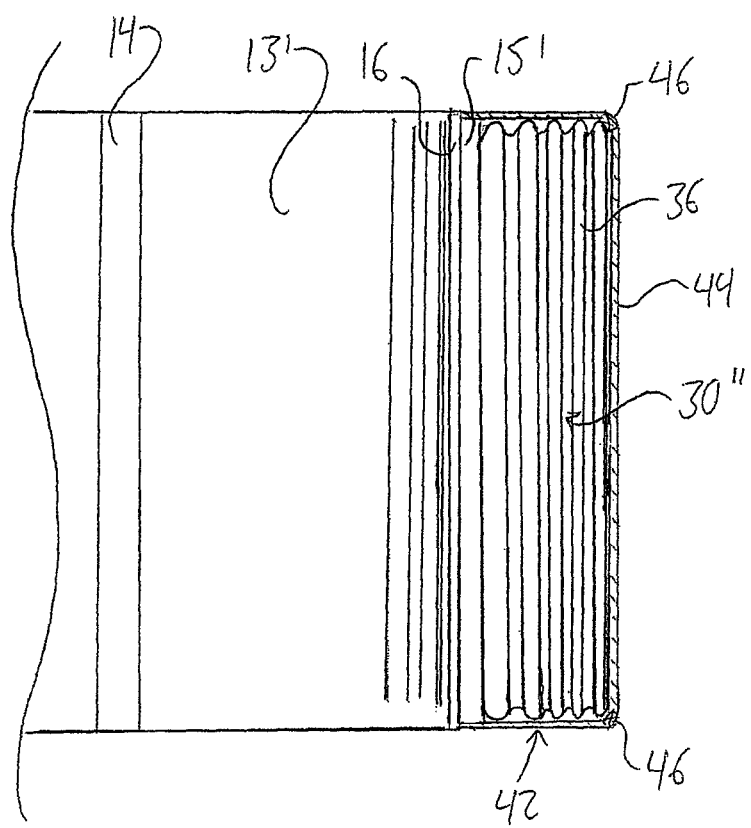
FIG. 7 is a rear elevational view of the glass and safety or protective device of FIG. 7 with a side of the cover cut away for illustrative purposes.

However in another arrangement shown in FIGS. 6 and 7, the edge of the glass is curved out of the flat plane of the glass and the bracket is mounted on the convex side of the curved edge.

In the arrangements of FIGS. 3 to 5, there is provided a row of gas springs embedded in a foam body along the edge of the glass, whether each spring is circular or of vertically elongated cross section to extend along the bracket at the edge of the glass. The variant of FIGS. 6 and 7 differ in that there is provided only a single gas spring 30", which is mounted without any surrounding foam material and which has an elongated cross-sectional shape that is sufficiently long in the vertical direction to span the full, or substantially full, height of the glass 13'.

The device features a mounting bracket 15' with a flat outer face against which an end of the gas spring 30" is abutted, and an opposing face with a curvature suitable to sit flush against the curved edge portion of the glass 13'. The device may be secured to the glass in any suitable manner, for example by adhesive bonding of the bracket 15' to the glass 13', or bolting of the bracket to the glass through alignable holes in the bracket and the glass. Alternatively, another embodiment may forgo the mounting bracket 15' an have an inner end of the spring directly fixed or fastened to the glass.

FIGS. 6 and 7 also illustrate an alternate cover design, where the cover 42' does not fully enclose all sides of the device, instead lacking any closure on the side of the device that is mounted up against the glass 13.

While FIGS. 6 and 7 show the device mounted to position the spring axis parallel to the plane of the flat portion of the glass at a short distance outward therefrom, it may alternatively be configured to place the spring nearer to this primary flat plane of the glass, but still parallel thereto, or to angle the spring axis to extend obliquely toward the primary plane of the glass, but preferably without projecting inward therepast toward the playing area bound by the boards. With reference to FIGS. 2, 9 and 10, all embodiments of the present invention may be similarly placed so that no portions of the spring or springs projects past the upright plane of the glass into the playing area of the hockey rink bound by the glass. With reference to FIGS. 9 and 10 specifically, the foam body 32 may be positioned to reach and occupy the upright plane of the glass 13 without reaching therepast so as to prevent interference with shooting of the puck along the glass.

Where visibility is required, the cover may be transparent and the springs likewise formed from a transparent material. While FIGS. 6 and 7 illustrated a particular arrangement in which foam is omitted and a single gas spring provides all the resilience of the shock absorbing system, other arrangements may similarly omit foam material while using a row of multiple gas springs which are independent of foam material so that the resilience of the shock absorbing system is provided solely by the compression of one or more of the gas springs.

Although the term glass is used in the forgoing description to refer to the transparent shielding/viewing panels through which spectators and other observers can view the playing area bound by the boards while being protected from a puck that is raised above the height of the opaque boards during play, it will be appreciated that use of other transparent or substantially transparent materials will not detriment to the functionality of the present invention. For example, it has become known to use acrylic panels instead of glass for these panels, and the present invention may likewise be used to protect players from the edge, corner, bracket or stanchion at the end of a panel regardless of its particular material composition.

The drawings of the preceding embodiments of based on prototypes of the invention produced from off the shelf components, which resulted in overall structures which may be considered bulky and somewhat obstructive to visibility of the playing area. However, it will be understood the smaller components (e.g. shorter springs) projecting shorter distances along and across the lengthwise direction of the boards at the edge of the glass may be used to provide an impact absorbing function with reduced detriment to spectator sight lines.

Figure 8:
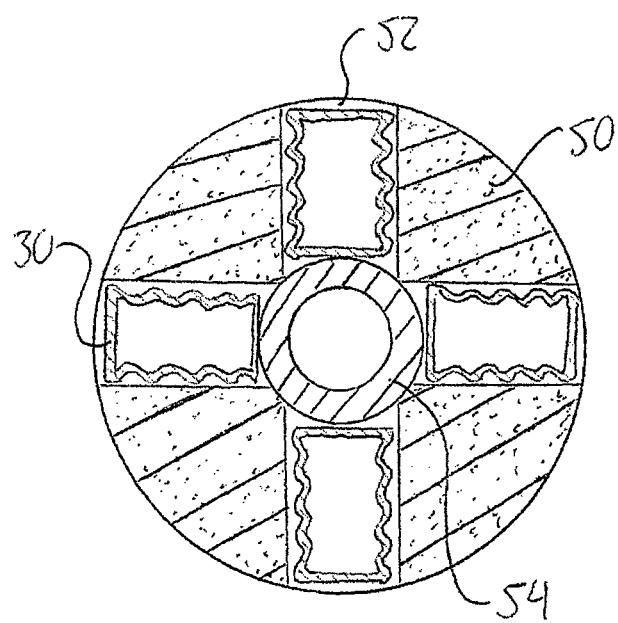
FIG. 8 illustrates a third embodiment safety or protective device for use on upright post structures of various sports equipment so similarly use gas springs to absorb force during impact by a player.

In FIG. 8 is shown another arrangement for use for example with a post of a sporting equipment structure which is located at a position which might be impacted by the player. Examples of such applications include football posts, basketball stanchions, soccer goal posts, etc.

At multiple heights along it, the device features a hollow cylindrical sleeve of foam material 50 having radial bores 52 extending into the cylindrical hollow interior thereof from spaced locations around the outer circumference of the sleeve. Each radial bore 52 receives a respective gas spring 30, so that the sleeve provides a radial array of the gas springs 30 located wholly or partly around a post 54 about which the sleeve is fitted. The sleeve length is selected to extend along the post to a required height so that up to the whole periphery of the post may be protected from an impact in any direction.

In other embodiments, for example where protection in all directions is not required, the foam padding may not necessarily form a fully closed sleeve around the post, and for example may be an arcuate span of foam having one or more radial bores at one or more levels along the height of the body.

Again, gas springs of various cross-sectional shapes, and accordingly shaped holes in the foam, may be employed, in which case vertically elongated springs may be used to reduce the number of springs required to span a particular height of the foam body.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In combination with an upright panel mounted atop boards of a hockey rink that delimit a playing area thereof, a protective device for an edge of said panel, the device comprising:
   a bracket mounted at or on the edge of the panel;
   an upstanding engagement member equal or similar in height to the panel, the engagement member being supported in a position placing an outer face of the engagement member in an orientation facing away from said edge of the panel at a distance spaced therefrom in a lengthwise direction of the boards;
   and a shock absorbing system located between the bracket and the outer face of the engagement member and being compressible in a longitudinal impact direction that is parallel to a flat upright plane of the panel and parallel to the lengthwise direction of the boards, whereby the shock absorbing system is arranged to absorb against the outer face of the engagement member in the longitudinal impact direction;

wherein the shock absorbing system is free of any component or portion that extends beyond the flat upright plane of the panel into the playing area of the hockey rink.

2. The device according to claim 1 wherein the engagement member comprises a body of resilient material and the shock absorbing system includes at least one spring inside said body of resilient material.

3. The device according to claim 2 wherein said spring is a gas spring.

4. The device according to claim 3 wherein said gas spring is received in a respective hole located in the body of resilient material.

5. The device according to claim 3 wherein the gas spring compresses by allowing air to escape and re-expands by resilience in a wall of the spring acting to re-inflate the spring and return the expelled air.

6. The device according to claim 1 wherein the panel lies entirety in the flat upright plane.

7. The device according to claim 1 wherein the edge of the panel is curved out of the flat upright plane and the bracket is mounted on a convex side of the curved edge.

8. The device according to claim 2 comprising a flexible cover situated over the resilient body and the shock absorbing system, wherein the flexible cover is transparent and the at least one spring is formed from a transparent material.

9. The device according to claim 1 wherein the engagement member comprises a body of resilient material having an upright slot therein in which the bracket is received, whereby the resilient body embraces opposing sides of said bracket.

10. In combination with upright glass mounted atop boards of a hockey rink that delimit a playing area thereof, a protective device for use thereon, the device comprising:

a bracket mounted at or on an edge of a sheet of said upright glass of the hockey rink;

an upstanding elongate engagement member generally parallel to the bracket and equal or similar to the glass in height, the engagement member being supported in a position placing an outer face of the engagement member in an orientation facing away from said edge of the glass at a distance spaced therefrom in a lengthwise direction of the boards;

and a shock absorbing system located between the bracket and the outer face of the engagement member and being compressible in a longitudinal impact direction that is parallel to a flat upright plane of the glass and parallel to the lengthwise direction of the boards, whereby the shock absorbing system is arranged to absorb impact against the outer face of the engagement member in the longitudinal impact direction;

wherein the shock absorbing system is free of any component or portion that extends beyond the flat upright plane of the glass into the playing area of the hockey rink.

11. The device according to claim 10 wherein the engagement member comprises a body of resilient material having an upright slot therein in which the edge of the sheet of said upright glass is received, whereby the resilient body embraces opposing sides of said upright glass.

12. The device according to claim 10 wherein the engagement member comprises a body of resilient material and the shock absorbing system includes at least one spring inside said body of resilient material.

13. The device according to claim 12 wherein said spring is a gas spring.

14. The device according to claim 13 wherein said gas spring is received in a respective hole located in the body of resilient material.

15. The device according to claim 13 wherein the gas spring compresses by allowing air to escape and re-expands by resilience in a wall of the spring acting to re-inflate the spring and return the expelled air.

16. The device according to claim 10 wherein the glass lies entirety in the flat upright plane.

17. The device according to claim 10 wherein the edge of the glass is curved out of the flat upright plane and the bracket is mounted on a convex side of the curved edge.

18. The device according to claim 12 comprising a flexible cover situated over the resilient body and the shock absorbing system, wherein the flexible cover is transparent and the at least one spring is formed from a transparent material.

\* \* \* \* \*